(12) United States Patent
Barnard et al.

(10) Patent No.: US 8,240,392 B2
(45) Date of Patent: Aug. 14, 2012

(54) USE OF FOAM SHAPE MEMORY POLYMER TO TRANSPORT ACID OR OTHER WELLBORE TREATMENTS

(75) Inventors: Jason J. Barnard, Katy, TX (US); Allen D. Gabrysch, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 384 days.

(21) Appl. No.: 12/565,120

(22) Filed: Sep. 23, 2009

(65) Prior Publication Data

US 2011/0067873 A1    Mar. 24, 2011

(51) Int. Cl.
  *E21B 33/12* (2006.01)
  *E21B 36/00* (2006.01)
(52) U.S. Cl. ........ 166/386; 166/135; 166/192; 166/186; 166/302; 166/387

(58) Field of Classification Search .................. None
See application file for complete search history.

(56) References Cited

U.S. PATENT DOCUMENTS

| 4,515,213 | A | * | 5/1985 | Rogen et al. ............... 166/123 |
| 4,611,664 | A | | 9/1986 | Osterhoudt, III et al. |
| 6,613,720 | B1 | | 9/2003 | Feraud et al. |
| 2004/0014607 | A1 | | 1/2004 | Sinclair et al. |
| 2008/0296020 | A1 | | 12/2008 | Willauer |
| 2008/0296023 | A1 | | 12/2008 | Willauer |

* cited by examiner

*Primary Examiner* — Zakiya W Bates
(74) *Attorney, Agent, or Firm* — Cantor Colburn LLP

(57) ABSTRACT

An embodiment provides a device that includes a shape memory member having a sealed outer surface and a permeable inner mass and a selected fluid placed and sealed within the inner mass at a first temperature. The selected fluid is released from the inner mass when the shape memory member is heated to a second temperature.

20 Claims, 4 Drawing Sheets

USE OF FOAM SHAPE MEMORY POLYMER TO TRANSPORT ACID OR OTHER WELLBORE TREATMENTS

BACKGROUND

1. Field of the Disclosure

The disclosure relates generally to devices containing fluids and apparatus and methods for transporting such fluid-containing devices to selected locations within wellbores.

2. Description of the Related Art

Hydrocarbons, such as oil and gas, are recovered from a subterranean formation using a wellbore drilled into the formation. Such wells are typically completed by placing a casing along the wellbore length and perforating the casing adjacent each such production zone to extract the formation fluids (such as hydrocarbons). At selected locations within the wellbore, materials such as chemical and other additives (also referred to herein as treatment fluids) are often used to improve the flow of formation fluids within the wellbore. Treatment fluids are also used to reduce corrosion of components within the wellbore. The location where a treatment fluid is transported may be a production zone at a selected depth within the wellbore. Treatment fluids are typically pumped from the surface in a state or form necessary to achieve the ultimately desired effect. However, it is generally difficult and often unsafe to pump harsh treatment fluids, such as acids, from the surface to downhole locations. It is therefore desirable to transport certain types of treatment fluids from the surface to selected locations within a wellbore without exposing such fluids to regions between the surface and selected location.

The present disclosure addresses some of the above-noted deficiencies in current procedures and apparatus and provides devices to contain treatment fluid that may thereby be transported to downhole locations without exposing the fluid to the wellbore locations between the surface and the downhole locations.

SUMMARY

In aspects, the present disclosure provides a device that includes a shape memory member having a sealed outer surface and a permeable inner mass and a selected fluid placed and sealed within the inner mass at a first temperature. The selected fluid is released from the inner mass when the shape memory member is heated to a second temperature.

In aspects, a method is provided for making a device to retain a fluid. The method in one embodiment may include: providing a shape memory member containing an inner mass configured to receive a selected fluid; heating the shape memory member to obtain a first shape; placing the selected fluid in the inner mass; sealing the shape memory member; and cooling the shape conforming member to cause the inner mass to retain the selected fluid within the sealed shape memory member.

BRIEF DESCRIPTION OF THE DRAWINGS

The advantages and further aspects of the disclosure will be appreciated by those of ordinary skill in the art as the same becomes better understood by reference to the following detailed description in conjunction with the accompanying drawings in which like reference characters generally designate like or similar elements in the several figures of the drawing and wherein.

DETAILED DESCRIPTION

Figure 1:
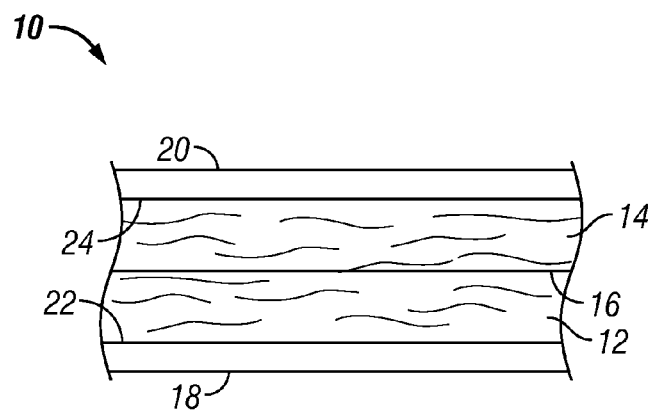
FIG. 1 is a side view of a portion of an exemplary fluid transport device in accordance with one embodiment of the present disclosure.

The present disclosure relates to devices for containing fluid and methods for transporting such devices to selected locations of a hydrocarbon-producing well. The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein.

Aspects of the disclosure herein include the manufacture and use of materials (also referred to herein as "compositions") that in one aspect are capable of being expanded to a first or original size and shape by exposing such materials to a selected form of energy and are further capable of being compressed to retain a second size and shape when the energy supply is removed. Such compositions may be placed in a wellbore in their respective second sizes and shapes and then deployed in the wellbore by expanding them to their original sizes and shapes by exposing them to the selected form of energy. In exemplary, non-limiting embodiments, such deployment may occur at a point in time relatively removed from the time of the material's initial placement in the wellbore. In other non-limiting embodiments, the materials may have a permeable characteristic, enabling the materials to absorb or intake a selected fluid. In one aspect, such materials may be configured to absorb a selected fluid while in one state or shape and then seal the selected fluid within the materials in a second state or shape. In such an example, the energy may be added or removed from the materials based whether the materials are absorbing or carrying the fluid. Such liquid-filled materials may be deployed at a selected downhole location, thus enabling the selected fluid to be transported and released at such location by controlling energy supplied to the materials at such location.

Aspects hereof also include compositions that include shape-conforming materials (also referred to as "shape-memory materials"), devices made using such materials and methods of their use. In one aspect, a fluid transport device may be made using any suitable material, including, but not limited to, syntactic and conventional memory foams, a shape memory polymer (SMP), and a combination thereof. As used herein, the term "memory" refers to the capability of a material to withstand certain stresses, such as external mechanical compression, vacuum and the like, but to then return, under appropriate conditions, such as exposure to a selected form of energy, often heat, to the material's original size and shape.

In certain non-limiting embodiments, the fluid transport device may include a foam that may be either open cell or closed cell. The selection of a particular foam will generally depend upon the desired properties of the fluid transport device. Open cell foams, for example, are those foams wherein a significant proportion of the cell walls that form during the foaming process are either broken during that process, or are broken thereafter, by any suitable method, such as the application of mechanical forces. In aspects, such open cell structure may be sufficiently porous and/or permeable so as to enable the passage of fluids therethrough and the storage of fluids within. In contrast, closed cell foams may be better suited for use in fluid sealing apparatuses, where it is desired to prevent most or all passage of materials, whether liquid, solid, or both, therethrough.

In other aspects, the shape memory materials may include any material capable of withstanding typical downhole conditions without experiencing an unacceptable level of degradation. In non-limiting embodiments, such material may be prepared from a thermoplastic or thermoset medium. This medium may contain a number of additives and/or other formulation components that alter or modify the properties of the resulting shape memory material. For example, in some non-limiting embodiments the shape memory material may be either thermoplastic or thermoset in nature, and may be selected from a group consisting of polyurethanes, polystyrenes, polyethylenes, epoxies, rubbers, fluoroelastomers, nitriles, ethylene propylene diene monomers (EPDM), other polymers, combinations thereof, and the like.

In aspects, the shape memory material may be described as having a "shape memory" property. As used herein, the term "shape memory" refers to the capacity of the material to be heated above the material's glass transition temperature (GTT), and then to be compressed and cooled to a lower temperature, retaining its compressed state. However, the same material may then be restored to its original shape and size, i.e., its pre-compressed state, by reheating that material to close to or above its glass transition temperature (GTT). This subgroup, which may include certain syntactic and conventional foams, may be formulated to achieve a desired GTT for a given application. For instance, a foaming medium may be formulated to have a GTT slightly below the anticipated downhole temperature at the depth at which the material will be used. The chosen material may include a conventional foam or a combination of different foams and other materials. Further, the foam medium may be formulated to have a GTT below the anticipated temperature of the selected location within the wellbore where the operator desires the fluid to be released. While the teachings of the present disclosure may be applied to a variety of subsurface applications, for purposes of simplicity, illustrative embodiments of such fluid transport devices will be described in the context of hydrocarbon production wellbores.

The initial (as-formed) shape of a member comprised of the shape memory material may vary, though an essentially cylindrical or squared shape is usually well-suited to absorb a selected fluid as well as for downhole applications. Once the member of shape memory material is compressed and cooled below the GTT, the shape of the member may also vary, though a vessel or pocket-shaped member with compressed sealed edges is particularly suited to store a selected treatment fluid.

In embodiments a device may be configured to transport materials, including, but not limited to, treatment fluids for use in a wellbore to improve flow of hydrocarbons from the formation into the wellbore and through the wellbore to the surface. Further, the treatment fluid may also be utilized to reduce corrosion and asphaltene formation downhole. In one aspect, the device may use a shape memory material that seals the treatment fluid within an inner structure or mass at a first temperature and releases the treatment fluid in the wellbore at a second elevated temperature. The device may be formed into any suitable size and shape, such as a vessel or capsule, to seal the selected treatment fluid therein. Such devices may be transported into the well by placing the devices in a fluid and pumping the fluid from the surface to a selected location in the wellbore. The device may include an inner mass of a shape memory permeable open cell foam and an outer surface of a non-permeable foam. The permeable inner mass may receive the treatment fluid in its expanded state at a temperature above the GTT of the shape memory material. Upon cooling and compressing a portion of the shape memory material of the device, the treatment fluid may be sealed at a temperature below the GTT of the shape memory material. The device may release the treatment fluid from the inner mass at a selected location (e.g., depth) in the production zone upon heating the device above the GTT of the shape memory material.

In aspects, the foams for the fluid transport devices may be prepared from a medium possessing desired elastomeric properties. The medium may be formed into a solid structure by an expansion resulting from the introduction of bubbles into the foaming medium air or gas or combination of gases, such that the foaming medium is expanded to form cells of any dimension. In other aspects, syntactic foams, which are generally lightweight engineered foams manufactured by embedding hollow spheres, typically of glass, ceramic or polymers, in a resin matrix may be utilized. The embedded spheres are subsequently removed frequently by dissolution, although that is not the only removal option. Once the embedded spheres are removed, a solid material with an essentially cellular structure remains.

Figure 2:
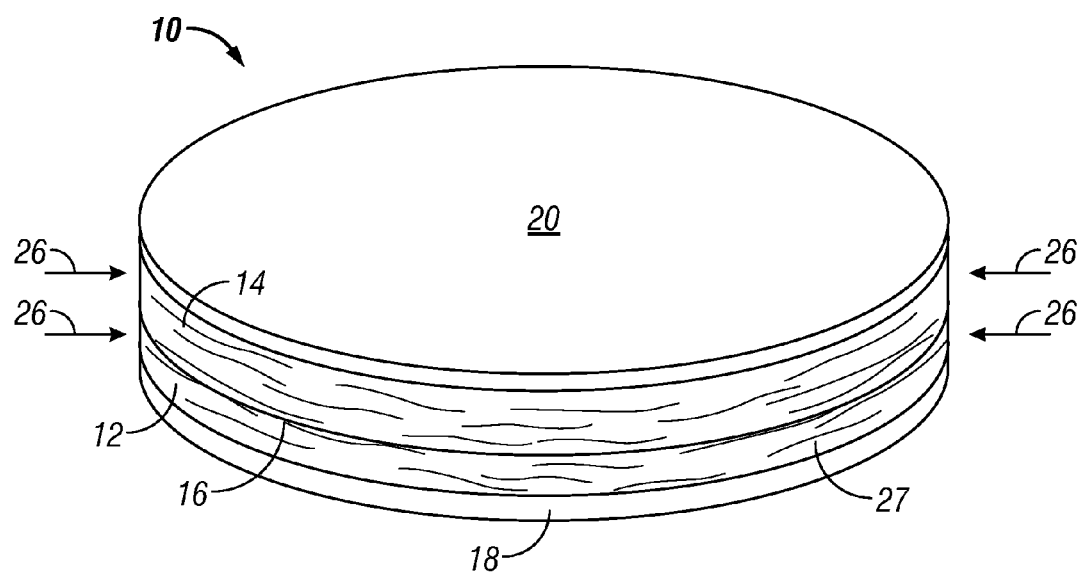
FIG. 2 is a perspective view of an exemplary fluid transport device configured to receive a selected fluid in a flat expanded shape in accordance with one embodiment of the present disclosure.
Figure 3:
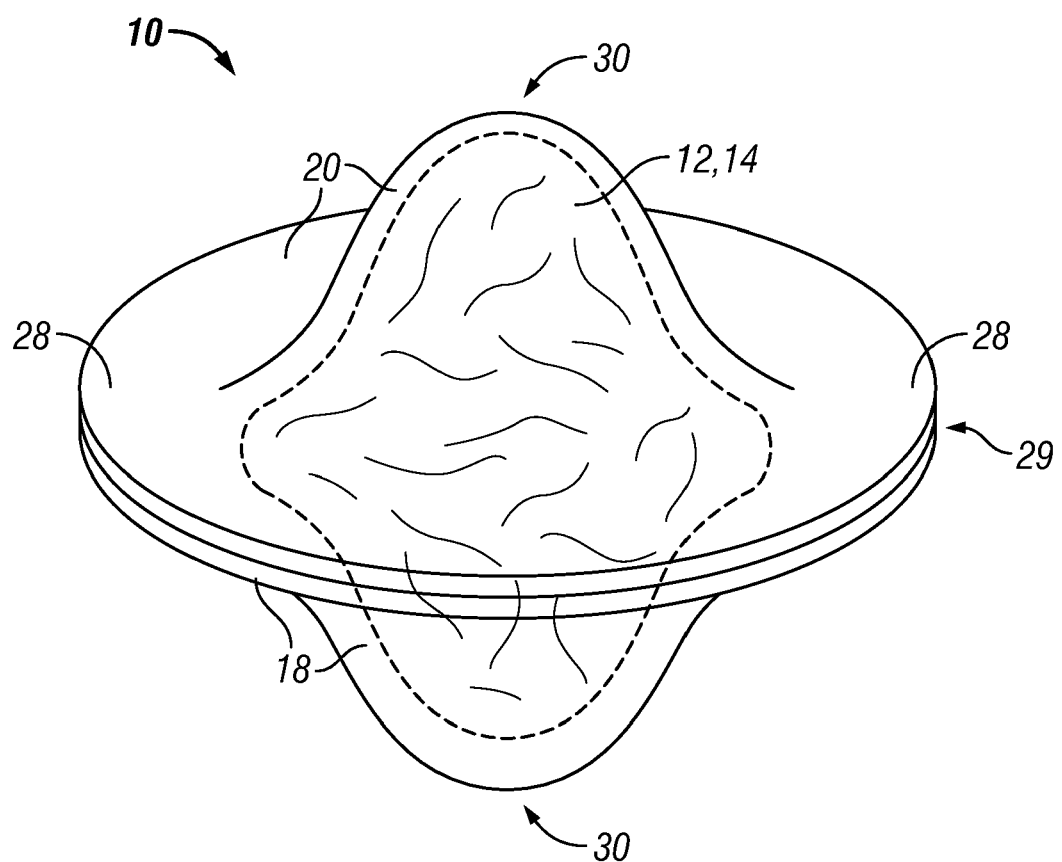
FIG. 3 is a perspective view of an exemplary fluid transport device that is compressed and configured to contain therein a selected fluid in accordance with one embodiment of the present disclosure.
Figure 4:
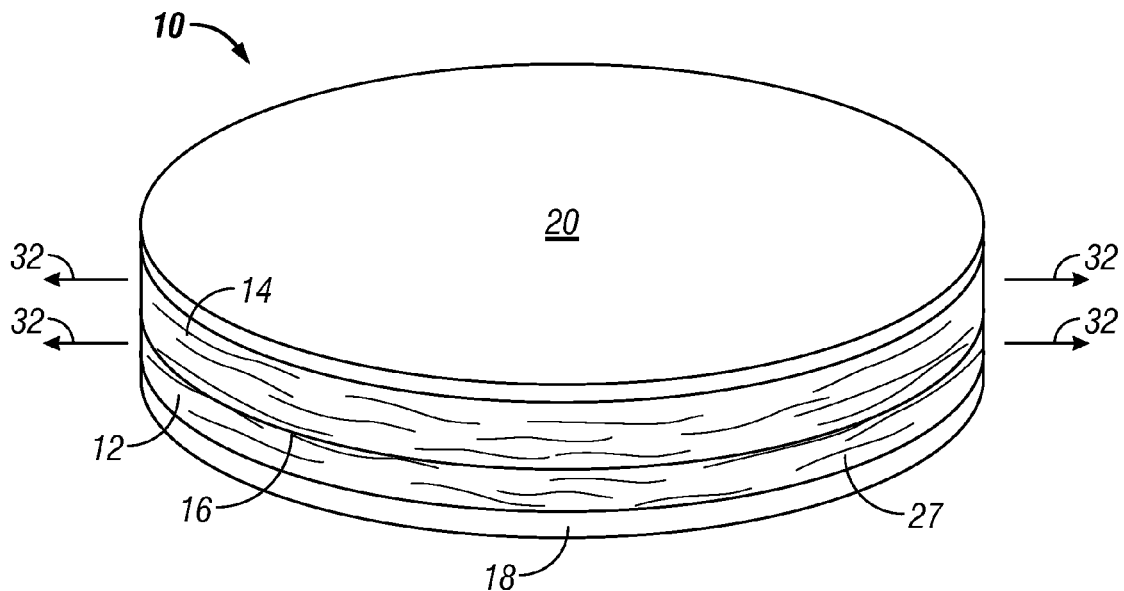
FIG. 4 is a perspective view of an exemplary fluid transport device configured to release a selected fluid in a flat expanded shape in accordance with one embodiment of the present disclosure.
Figure 5:
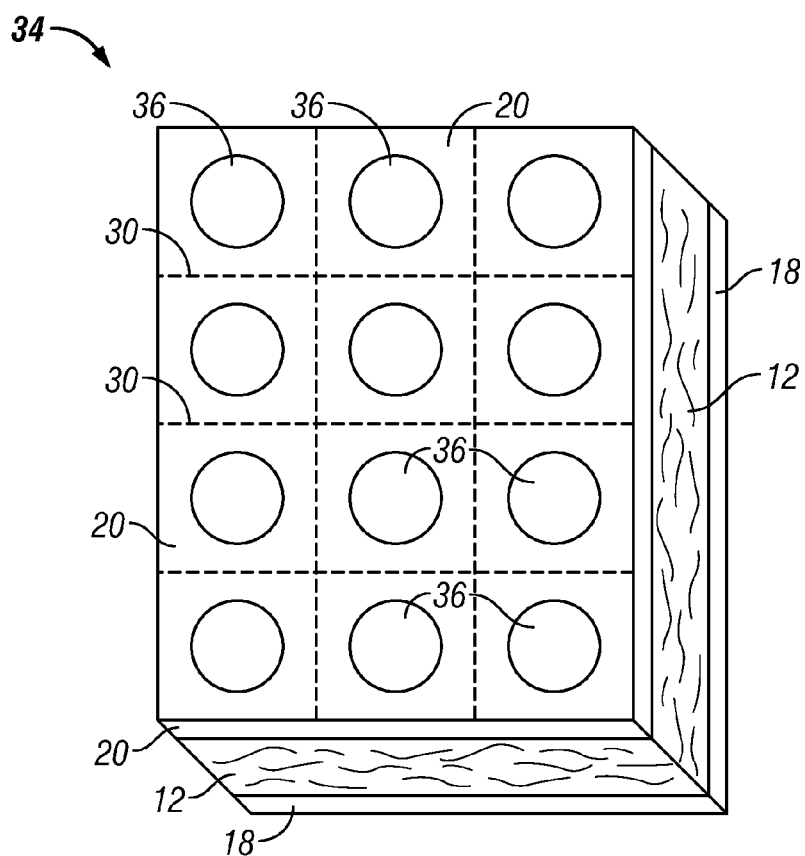
FIG. 5 illustrates a perspective view of an exemplary sheet of a plurality of fluid transport devices configured to receive a selected fluid in accordance with one embodiment of the present disclosure.

FIGS. 1-5 are illustrations of a fluid transport device and method for making such a device. Such a device may contain, transport, and release a selected material fluid to a selected location in a wellbore. FIGS. 1 and 2 show the elements of the device as it is configured to intake fluid, prior to sealing the fluid within the device. FIG. 2 shows the fluid transport device in an expanded state, where the device has been heated above its GTT. FIG. 3 is an illustration of the fluid transport device at a temperature below the GTT, with the selected fluid sealed within the device. As depicted in FIG. 3, the device and the fluid contained therein is sealed and configured to be transported to a selected wellbore location. FIG. 4 shows the device in an expanded state, at a temperature above the GTT, where the device releases the selected fluid at the selected wellbore location. FIG. 5 is an illustration of a system for simultaneous production of a plurality of fluid transport devices.

Referring to FIG. 1, the diagram illustrates a side view of a portion of an exemplary fluid transport device 10. The fluid transport device 10 is shown to include an inner mass of porous permeable foam layers 12 and 14. In one aspect, the layers 12 and 14 may be joined together by a bond plane 16, which may include an adhesive or similar coupling mechanism suitable to attach the permeable foam layers 12 and 14. The permeable foam layers 12 and 14 may be composed of an open cell SMP foam, which may expand or contract in response to exposure to certain energy, such as temperature.

In another aspect, the inner mass of the device 10 may be composed of a single layer of permeable foam, instead of separate layers 12 and 14. In such a case, the inner mass does not have a bond plane. As depicted, the fluid transport device 10 is in a state or shape that occurs at or about a room temperature, which may be less than a GTT of the inner mass 12 and 14. Thus, the shape and properties of the fluid transport device 10 change in response to temperature alterations.

As depicted, the fluid transport device 10 also includes a first outer non-permeable surface 18 and a second outer non-permeable surface 20. The non-permeable outer surfaces 18 and 20 may include a substantially or completely non-permeable material, which creates a seal when the outer portion of the surfaces 18 and 20 are compressed, thereby containing and retaining a selected fluid within the fluid transport device 10. The non-permeable surfaces 18 and 20 may be referred to as sealed outer surface layers with respect to the inner mass 12 and 14 of permeable foam. Further, the non-permeable outer surfaces 18 and 20 may be coupled to or bonded to the permeable foam layers 12 and 14 via joints 22 and 24, respectively. The joints 22 and 24 may include or utilize any suitable coupling, adhesive, or binding process. As illustrated in FIG. 1, the fluid transport device 10 is shown as a flat circular sheet or disc shape at a room temperature. As discussed in detail below, the fluid transport device 10 may take the form of a substantially flat and expanded shape when heated above the GTT of the inner mass of permeable foam layers 12 and 14.

FIG. 2 illustrates a perspective view of an exemplary fluid transport device 10. The illustrated embodiment shows the fluid transport device 10 in a flat circular or disc shape. The surface layers of non-permeable foam 18 and 20 are located on the outer portions of the inner mass of permeable foam layers 12 and 14, thereby enabling the treatment fluid to flow into the fluid transport device 10, as shown by fluid flow arrows 26. The fluid transport device 10 is shown in an expanded state, where the inner mass of permeable foam layers 12 and 14 is heated above its GTT, enabling the inner mass (12 and 14) to receive the fluid through an exposed permeable edge 27. As depicted, the permeable edge 27 is located around the perimeter of the flat disc shaped device 10. Other shapes may also be utilized for the fluid transport device 10, including, but not limited to, squares, hexagons, symmetric or non-symmetric polygons, or any suitable 3-dimensional structure. In addition, any suitable configuration may be used to expose a portion of the inner mass, thereby enabling fluid flow 26 to enter the fluid transport device 10. In an aspect, the fluid transport device 10 may receive the treatment fluid flow 26, thereby filling openings or cavities in a matrix of open cells within the inner mass. In an embodiment, each of the outer surface layers 18 and 20 may be about 15-35% of the thickness of each of the inner mass layers 12 and 14 or another suitable thickness. Alternatively, in an embodiment wherein the inner mass is composed of a single layer, each of the outer surface layers may be about 5-20% of the thickness of the single inner mass layer. The configuration of the outer surface layers enables fluid to flow into the inner mass while at a temperature near or above the GTT of the inner mass.

As depicted in FIG. 2, the treatment fluid may saturate or be absorbed within the fluid transport device 10 by injecting the fluid, submersing the device 10 in a solution of the treatment fluid, or any other suitable process for adding a fluid to the porous permeable material of the inner mass 12 and 14. For instance, the fluid transport device 10 may be vacuum formed into a vessel to draw the treatment fluid within the device 10 prior to sealing the structure.

FIG. 3 is a perspective view of an example of the fluid transport device 10 in a second compressed shape to contain the selected treatment fluid. The illustrated shape of the fluid transport device 10 may also be referred to as a vessel, capsule, or pill. As depicted, the fluid transport device 10 includes a compressed seal near a peripheral (outer) portion 28 of the device. In an aspect, the peripheral portion 28 is a portion of the device 10 where the inner mass of permeable foam 12 and 14 and the sealed outer surfaces 18 and 20 have been compressed and cooled. Accordingly, the edge of the shape memory material of the inner mass 12 and 14 is compressed while at a temperature above the GTT, enabling outer surfaces 18 and 20 to press together. The compression of the peripheral portion 28 occurs after the inner mass 12 and 14 is saturated with a desired amount of the treatment fluid, thereby sealing the fluid within the device 10. Further, an epoxy, bonding, or sealing mechanism may be placed on the peripheral portion 28 and/or an edge portion 29 to seal fluid within the device 10. Once compressed into the vessel shape, the fluid is sealed within the device 10 by cooling the device 10 below the GTT of the shape memory material of the inner mass (12, 14).

Any suitable process or mechanism may be used to compress and seal the peripheral portion 28 of the device 10. For example, the peripheral portion 28 may be compressed by pressing two rigid ring-shaped structures towards one another on each side of the outer surfaces 18 and 20, thereby leaving a space for a center pocket portion 30 that contains the treatment fluid.

The inner mass of permeable foam 12 and 14, as well as the non-permeable surfaces 18 and 20, may include a shape memory material which retains a second shape when cooled below its GTT. In one embodiment, the outer surfaces 18 and 20 may not include a shape memory material. In another embodiment, the outer surfaces 18 and 20 may include a shape memory material while the inner mass 12 and 14 may not include a shape memory material (i.e., the inner mass is composed of conventional open cell foam). After compressing the peripheral portion 28, the device 10 may be cooled below the GTT of the permeable inner mass (12 and 14), thereby forming the vessel shape of the fluid transport device 10. Accordingly, the fluid is sealed within the vessel-shaped device 10. After heating the device 10 above the GTT, the shape memory property of the inner mass causes the fluid transport device 10 to return to substantially the disc shape shown in FIG. 1. In an embodiment, the non-permeable foam layers 18 and 20 may each have a thickness of about 1/32 of an inch prior when in the disc shape, as shown in FIG. 2. The thickness of the edge portion 29 may be about 1/16 of an inch after compressing the peripheral portion 28 of the fluid transport device 10 to seal the treatment fluid. Accordingly, the exemplary vessel shaped device 10 may compress the inner mass of permeable foam 12 and 14 to a thickness of about 1/32 to 1/64 of an inch near the peripheral portion 28. Any other dimensions may be used for the purposes of this disclosure.

In one aspect, the fluid transport devices made according to this disclosure may be deployed into a wellbore. In such an application, the fluid transport devices 10, once deployed to the selected location, may release the fluid in such devices to improve hydrocarbon production from the well or to improve the health of downhole devices, such as valves, chokes, etc. The treatment fluid also may be used to reduce downtime and maintenance of the wellbore by reducing corrosion or material buildup. For instance, the treatment fluid may be an acid which is effective in removing or inhibiting a wax buildup at the selected location within the wellbore. In addition, the treatment fluid may be used to remove or reduce buildup within the production fluid flow.

FIG. 4 is a perspective view of the fluid transport device 10 in a disc shape. The depicted shape occurs when reheated above the GTT of the shape memory material to release the selected treatment fluid. As depicted, a fluid flow 32 shows the treatment fluid as it is released from the inner mass. In an aspect, the fluid transport device 10 returns to its original circular or disc shape, (similar to the shape shown in FIG. 2). The shape of the fluid transport device 10 changes due to the shape memory property of the inner mass 12 and 14. The inner mass 12 and 14 returns to the substantially expanded disc shape upon heating above the GTT. Accordingly, the pocket portion 30 of the device releases the treatment fluid as the inner mass within the peripheral portion 28 expands, thereby opening a passage for fluid flow 32. The vessel shape (of FIG. 3) is changed to the expanded disc shape (of FIG. 4) as the temperature at the selected location within the wellbore heats the fluid transport device at or above the GTT. In an embodiment, the fluid transport device 10 may be composed of a material such that the device dissolves over time within the well after releasing the treatment fluid. Alternatively, after releasing the treatment fluid, the fluid transport device 10 may be pumped with a fluid (e.g., mud) to the surface of the well.

In the embodiment shown in FIG. 3, a plurality of fluid transport devices 10 may be carried by a mud which is pumped into wellbore. Once the fluid transport devices 10 reach a selected location within the wellbore the temperature of the selected region may be increased above the GTT of the shape memory material. Thus, the fluid transport devices 10 regain their expanded flat shape (FIG. 4), enabling the release of the treatment fluid at the selected wellbore location. The temperature of the selected location within the axis may be controlled by any suitable mechanism, including, but not limited to, pressure manipulation, heating coils, sensing and feedback systems, or any combination thereof.

FIG. 5 is a perspective view of a production sheet 34 of a plurality of fluid transport devices 36, where a plurality of the transport devices 36 may be sealed with treatment fluid at the same time, thereby enabling mass production. As depicted, the inner mass of each of the fluid transport devices 36 may be a single sheet of permeable foam 12 coupled to outer surfaces of non-permeable foam 18 and 20. The layer of permeable foam is composed of a shape memory material, such as an SMP, and may be coupled to the outer surfaces 18 and 20. The production sheet 34 may retain an expanded flat sheet shape while at a temperature above the GTTs of the permeable foam 12 and/or non-permeable foams. While in an expanded flat sheet shape, the entire production sheet 34 may be saturated with the treatment fluid, enabling each fluid transport device to receive a selected amount of fluid. After the production sheet 34 receives the treatment fluid a mechanism may be used to compress the peripheral portions of the outer surfaces 18 and 20 of each transport device 36 are compressed to seal the treatment fluid within the "pocket" of each fluid transport device 36. After cooling the production sheet 34 below the GTTs of the permeable and/or non-permeable foams, the production sheet 34 may be cut along lines 38 to separate each of the fluid transport devices 36, thereby sealing the selected fluid within each device. As shown, after separation along lines 38 the fluid transport devices 36 are substantially square shaped. The configuration and shapes of sheets and devices may vary to improve manufacturing and to adapt to the requirements of a specific application. As discussed above, once each of the fluid transport devices 36 is sealed and cooled below the GTT, each device may be pumped into a wellbore and configured to release the treatment fluid in a selected area of the wellbore, by heating the devices above the GTT of the permeable foam layers.

Figure 6:
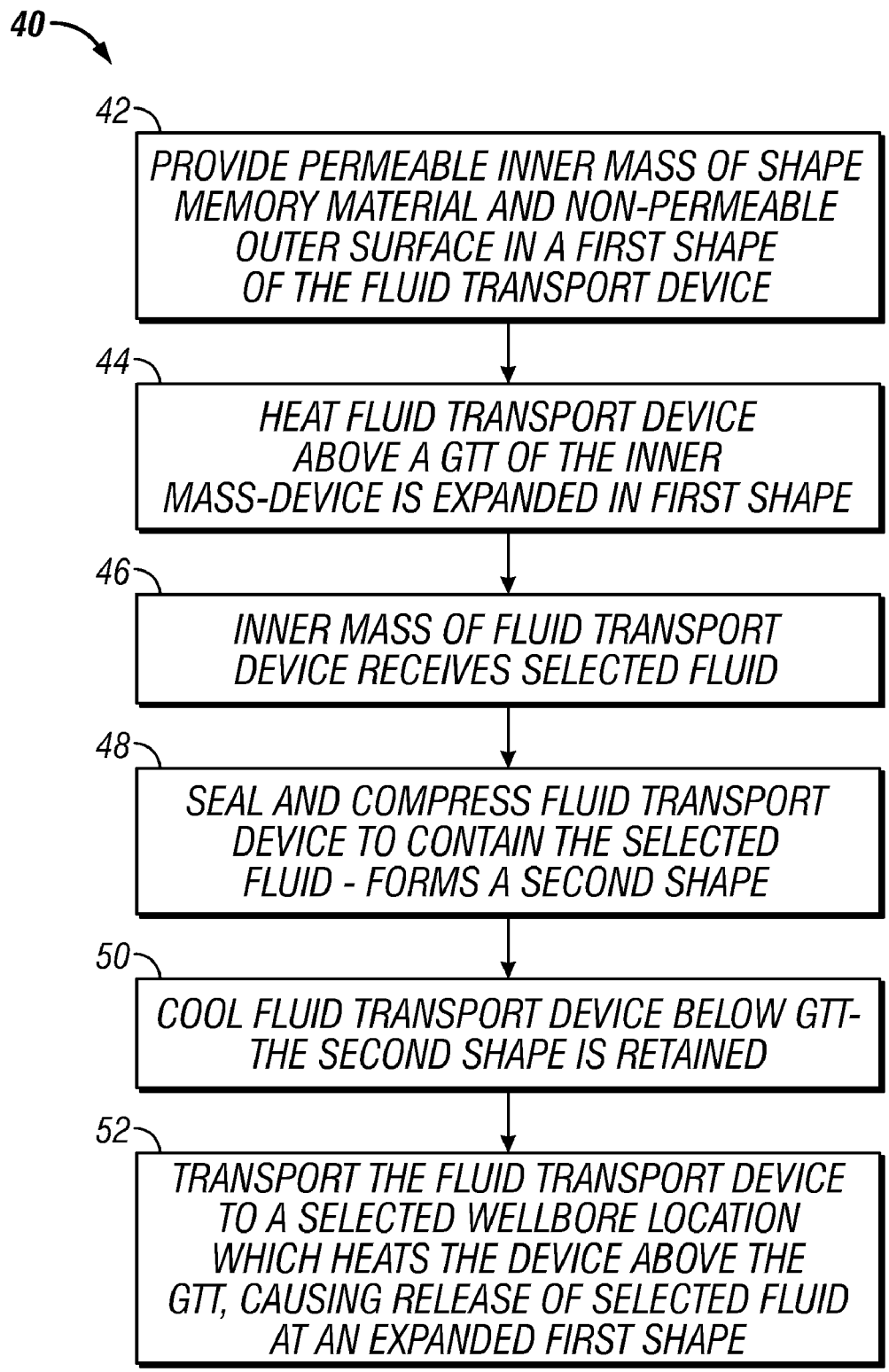
FIG. 6 illustrates an exemplary process for sealing a selected fluid within a fluid transport device in accordance with one embodiment of the present disclosure.

FIG. 6 illustrates an exemplary method or process for making a fluid transport device and transporting fluid to a selected wellbore location. In step 42, a permeable inner mass, composed of shape memory material, and a non-permeable outer surface form a first shape (e.g. disc) of the fluid transport device. In step 44, the device expands as it is heated to a temperature above a GTT of the inner mass. In step 46, the inner mass receives a selected fluid. In step 48, the device is sealed and compressed to form a second shape (e.g. vessel) to contain the selected fluid. In step 50, the vessel is cooled below the GTT of the inner mass, thereby retaining the second shape for the device. In step 52, the fluid transport device is transported to a selected wellbore location. The selected wellbore location heats the device above the GTT of the inner mass, causing the device to return to its expanded first shape, thereby releasing the selected fluid.

The invention claimed is:

1. A device, comprising:
   a shape memory member having a sealed outer surface and a permeable inner mass; and
   a selected fluid placed and sealed within the inner mass at a first temperature, wherein the selected fluid is released from the inner mass when the shape memory member is heated to a second temperature.

2. The device of claim 1, wherein the sealed outer surface comprises a non-permeable foam.

3. The device of claim 1, wherein the inner mass comprises an open cell foam.

4. The device of claim 1, wherein the first temperature is less than a glass transition temperature for the inner mass.

5. The device of claim 1, wherein the second temperature is greater than a glass transition temperature for the inner mass.

6. The device of claim 1, comprising a first vessel shape for the shape memory member at the first temperature.

7. The device of claim 1, comprising a second flat expanded shape for the shape memory member at the second temperature.

8. A device, comprising:
   a member comprising a shape memory material configured to contain a selected fluid at a first temperature and release the selected fluid upon a heating of the member to a second temperature, wherein the member comprises an outer surface of non-permeable foam and an inner mass of permeable open cell foam.

9. The device of claim 8, wherein the first temperature is less than a glass transition temperature for the shape memory material.

10. The device of claim 8, wherein the second temperature is greater than a glass transition temperature for the shape memory material.

11. A method for making a device to retain a fluid, comprising:
    providing a shape memory member containing an inner mass configured to receive a selected fluid;
    heating the shape memory member to take a first shape;
    placing the selected fluid in the inner mass; and
    sealing and cooling the shape memory member to cause the selected fluid to be retained in the inner mass.

12. The method of claim 11, comprising providing a non-permeable member on a portion of an outer surface of the shape memory material, wherein a portion of the inner mass is exposed to receive the selected fluid prior to sealing the shape memory member.

13. The method of claim 11, wherein sealing and cooling the shape memory member comprises cooling the shape memory member to a temperature that is less than a glass transition temperature of the shape memory member.

14. The method of claim 11, wherein heating the shape memory member comprises heating the shape memory member to a temperature that is about equal to or greater than a glass transition temperature of the shape memory member.

15. The method of claim 11, wherein providing a shape memory member comprises configuring the inner mass to release the selected fluid after heating the shape memory member equal to or greater than a glass transition temperature of the shape memory member.

16. A method for placing a selected fluid in a selected location in a wellbore, comprising:
  obtaining a device, wherein the device comprises:
    a shape memory member having a sealed outer surface and porous and permeable inner mass; and
    a selected fluid placed and sealed within the inner mass at a first temperature, wherein the selected fluid is released from the inner mass when the shape memory member is heated to a second temperature;
  transporting the device to the selected location in the wellbore; and
  increasing a temperature of the selected location to the second temperature to release the selected fluid.

17. The method of claim 16, wherein transporting the device to the selected location comprises pumping the device in a liquid.

18. The method of claim 16, wherein transporting the device to the selected location comprises maintaining the device at the first temperature.

19. The method of claim 16, wherein the first temperature is less than a glass transition temperature for the inner mass.

20. The method of claim 16, wherein increasing a temperature of the selected location in the wellbore to the second temperature comprises heating the device to greater than a glass transition temperature for the inner mass.

* * * * *